United States Patent [19]
Kusano

[11] Patent Number: 5,459,718
[45] Date of Patent: Oct. 17, 1995

[54] CROSS CONNECTION BY USING A SWITCH REQUEST FLAG IN A DIGITAL SIGNAL FAILS BEFORE SUPPLY TO CROSS CONNECTED SWITCH UNITS

[75] Inventor: Toshihiko Kusano, Tokyo, Japan

[73] Assignee: NEC Corporation, Japan

[21] Appl. No.: 231,391

[22] Filed: Apr. 22, 1994

[30] Foreign Application Priority Data

Apr. 23, 1993 [JP] Japan ..................... 5-097797

[51] Int. Cl.[6] .................... H04L 12/52; H04Q 3/32; H04Q 11/04
[52] U.S. Cl. .................... 370/16; 370/54; 370/58.2; 370/65.5; 340/826; 340/825.17; 340/825.8; 379/271; 379/279; 371/8.2; 371/11.1; 371/49.1; 395/182.02
[58] Field of Search .................... 370/13, 16, 53, 370/54, 56, 58.1, 58.2, 58.3, 65, 65.5, 112; 340/825.03, 826, 827, 825.16, 825.17, 825.36, 825.79, 825.8; 371/8.1, 8.2, 9.1, 11.1, 11.2, 24, 67.1, 71, 49.1, 49.2, 49.4; 379/219, 220, 221, 258, 268, 271, 272, 273, 279, 290, 291, 335

[56] References Cited

U.S. PATENT DOCUMENTS

| | | | |
|---|---|---|---|
| 4,807,280 | 2/1989 | Posner et al. | 340/826 |
| 4,845,736 | 7/1989 | Posner et al. | 379/272 |
| 4,914,429 | 4/1990 | Lipp | 340/825.8 |
| 4,935,921 | 6/1990 | Ishizaki et al. | 370/58.1 |
| 4,984,237 | 1/1991 | Franaszek | 370/54 |
| 5,241,550 | 8/1993 | Kusano | 371/71 |

*Primary Examiner*—Alpus Hsu
*Attorney, Agent, or Firm*—Ostrolenk, Faber, Gerb & Soffen

[57] ABSTRACT

In a cross connecting network wherein a branching device branches a group of digital signals into duplexed groups for supply to two switch matrix devices, each including switch elements in foremost through last stages, at least three in number, to cross switch the digital signals through cross connected paths with a switch request flag superposed on each digital signal downstream of a defective element of the switch elements and wherein a redundancy switching device detects the flag to make a control device control the switch elements of the last stage selectively connect the cross connected paths of the switch matrix devices path by path to switching device paths, a monitor is used in the cross connected paths of each switch matrix device before each switch element of the second through the last stages to detect a monitor datum sent thereto together with each digital signal to locate the defective element, and to assist the control device in path by path selecting the cross connected paths of each switch matrix device. The switch elements may be grouped into switch units. Preferably, a like monitor is connected to each switching device path to detect if each switch element of the last stage is defective. More preferably, an indicator is connected to the monitor to indicate the defective element.

18 Claims, 4 Drawing Sheets

FIG. 3
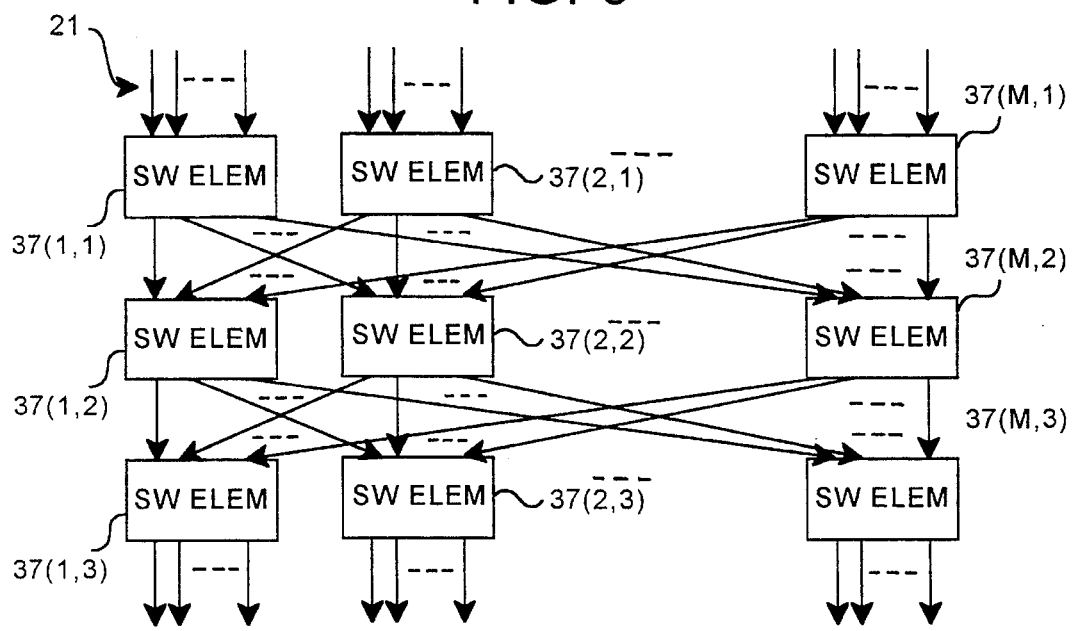
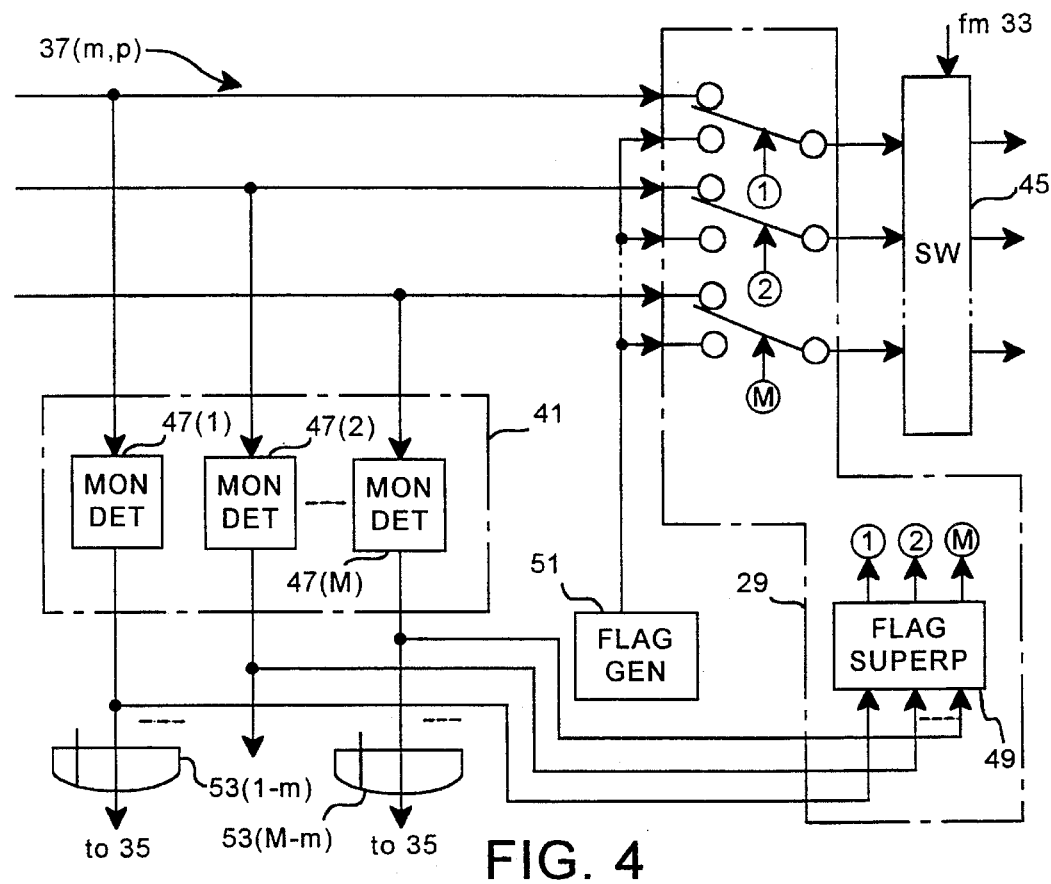
FIG. 4

CROSS CONNECTION BY USING A SWITCH REQUEST FLAG IN A DIGITAL SIGNAL FAILS BEFORE SUPPLY TO CROSS CONNECTED SWITCH UNITS

BACKGROUND OF THE INVENTION

This invention relates to cross switching of digital signal transmission paths which are established in duplex by switch elements controlled by a control device in two switch matrix devices and selected by a transmit or redundancy switching device under control by the control device depending on a failure in the switch elements. Each of the switch matrix devices may be a space matrix switch. The switch elements may be grouped or integrated into printed circuit modules, which may be called switch units. More particularly, this invention relates to a cross connecting method and to a cross connecting network.

A somewhat different cross connecting network is disclosed in U.S. Pat. No. 5,241,550 issued to Toshihiko Kusano, the present inventor. An improved cross connecting network is revealed in prior patent application filed Feb. 16, 1993, by Toshihiko Kusano, the instant inventor, under Ser. No. 08/018,027, now U.S. Pat. No. 5,365,511. The prior patent application is herein incorporated by reference.

In the manner which will later become clear, such a cross connecting network is controlled by a control device to establish a first plurality of network paths for digital signals. Each of the digital signals includes a blank data field at a period predetermined in connection therewith, namely, specific thereto. Such a period may be common to all digital signals. At any rate, the improved cross connecting network comprises first and second switch matrix devices, a preprocessor, a branching device, and a transmit or redundancy switching device.

Each switch matrix device has a device input side and a device output side and includes a second plurality of matrix device paths, where the second plurality is not less than the first plurality. If equal in number to the first plurality, the matrix device paths of each switch matrix device are for transmitting the digital signals, respectively. In the matrix device paths of each switch matrix device, a plurality of switch elements are interposed in each of foremost through last stages. The stages are successively arranged from the device input side to the device output side. In each switch matrix device the switch elements of the stages are controlled by the control device to cross switch the matrix device paths, or the digital signals, into or through cross connected paths. The cross connected paths of the first and the second switch matrix devices thus serve as duplexed parts of the network paths.

A combination of the preprocessor and the branching device is used as a branching arrangement including a plurality of branching arrangement paths, equal in number to the first plurality. The branching device branches the branching arrangement paths into primary branched paths continuous to the branching arrangement paths and secondary branched paths continuous to the branching arrangement paths. The primary and the secondary branched paths serve as additionally duplexed parts of the network paths. On the device input side, the primary branched paths are connected to the matrix device paths of the first switch matrix devices. The secondary branched paths are connected to the matrix device paths of the second switch matrix device. It is possible, if the matrix device paths of each switch matrix device are greater in number than the first plurality, to use the switch elements of the foremost stage of each switch matrix device in selecting the matrix device paths for connection to the branched paths of a pertinent one of the primary and the secondary ones.

The transmit switching device includes as additional parts of the network paths a plurality of switching device paths, not less in number than the first plurality. It will be presumed in each switch matrix device that the matrix device paths are cross switched at a certain current time instant into the cross connected paths. In the manner which will later be described, the control device selects at the current time instant a plurality of acting paths, equal in number to the first plurality, from the cross connected paths of the first and the second switch matrix devices. On the device output sides of the first and the second switch matrix devices, the acting paths are connected to the switching device paths. Others of the cross connected paths of the first and the second switch matrix devices are left unconnected to the switching device paths as standby paths which comprise corresponding paths in one-to-one correspondence to the acting paths.

In the improved cross connecting network, the control device is enabled so to connect the switching device paths to thee acting paths as follows. Switch failure detector elements are connected to the matrix device paths of the first and the second switch matrix devices nearer to the device output side than the switch elements of all stages, namely, whole switch elements, to detect whether-or not the digital signal is transmitted through each of the whole switch elements with an abnormal state. Furthermore, switch demand data generator units are connected to the failure detector elements, respectively. Processor units are connected to the switch demand data generator units and to the matrix device paths of the first and the second switch matrix devices downstream of the respective failure detector elements. A combination of each switch demand data generator unit and the processor unit therefor serves as a switch request flag superposing element for superposing a switch request flag on a predetermined part of the blank data field of each digital signal when the abnormal state is detected by one of the failure detector elements that is connected to the switch request flag superposing element under consideration as a particular failure detector element.

Presence of the abnormal state indicates either that the digital signal in question is wholly or partly lost or that some spurious data are superposed on the digital signal under consideration. Very presumably, a failure is present in one of the whole switch elements that is connected to the particular failure detector element. In other words, one of the acting paths is a defective path when the switch request flag is superposed on the digital signal transmitted therethrough. That is, the switch element in question is a defective element.

Switch request flag detector elements are therefore connected to the switching device paths, respectively, and to the control device. The switch request flag detector element detects the switch request flag in the digital signal transmitted through the defective path and consequently through one of the switching device paths that is connected to the switch request flag detector element under consideration as a particular device path. This switch request flag detector element informs the control device of detection of the switch request flag and of the defective path. The control device selects as a fresh path of the acting paths for connection to the particular device path one of the corresponding paths that corresponds to the defective path.

In the manner described in the foregoing, it is possible with the improved cross connecting network to substitute for the defective path, path by path rather than switch matrix device by switch matrix device, a faultless one of the corresponding paths as the fresh path. While diligently continuing reduction into practice of such a cross connecting network, the present inventor has confirmed that it is highly desirable to locate the defective element.

SUMMARY OF THE INVENTION

It is consequently an object of the present invention to provide a cross connecting method of establishing a first plurality of network paths for digital signals through a cross connecting network comprising first and second switch matrix devices including in each switch matrix device a second plurality, not less than the first plurality, of matrix device paths in which a plurality of switch elements are interposed and controlled by a control device to cross switch the matrix device paths into cross connected paths and to make the cross connected paths of the first and the second switch matrix devices serve as duplexed parts of the network paths and among which it is possible to locate a defective element of the switch elements of the first and the second switch matrix devices.

It is another object of this invention to provide a cross connecting method which is of the type described and is used in the cross connecting network comprising the plurality of switch elements in each of foremost through last stages in a direction of transmission of the digital signals through the matrix device paths and in which a switch request flag is superposed on each digital signal, if the digital signal fails after passing through the defective element in one of the stages, before supply to the switch elements of a next succeeding stage.

It is a different object of this invention to provide a cross connecting network for use in implementing the cross connecting method of the type described.

Other objects of this invention will become clear as the description proceeds.

In accordance with an aspect of this invention, there is provided a cross connecting method of establishing under control by a control device a first plurality of network paths for digital signals, each digital signal including a blank data field at a period predetermined therefor, through a cross connecting network comprising: (a) first and second switch matrix devices having device input and output sides, each switch matrix device including a second plurality of matrix device paths in which a plurality of switch elements are interposed in each of the foremost through the last stages successively arranged from the device input side to the device output side, the switch elements of the stages being controlled by the control device to cross switch the matrix device paths into cross connected paths, the second plurality being not less than the first plurality, the cross connected paths of the first and the second switch matrix devices serving as duplexed parts of the network paths (b) branching means for branching a plurality of branching means paths, equal in number to the first plurality, into primary and secondary branched paths connected as additionally duplexed parts of the network paths on the device input side to the matrix device paths of the first and the second switch matrix devices; and (c) a transmit switching device including a plurality of switching device paths, not less in number than the first plurality, connected as additional parts of the network paths on the device output side to a plurality of acting paths, equal in number to the first plurality, selected by the control device from the cross connected paths of the first and the second switch matrix devices with others of the cross connected paths of the first and the second switch matrix devices left as standby paths comprising corresponding paths in one-to-one correspondence to the acting paths.

According to the aspect being described, the cross connecting method comprises the steps of: (A) data superposing a monitor datum on a first part of the blank data field of each digital signal transmitted through the branching means paths; (B) data detecting the monitor datum to detect whether or not an error is present in the monitor datum transmitted through the matrix device paths of the first and the second switch matrix devices towards the switch elements of each of the stages except for the foremost stage; (C) flag superposing a switch request flag on a second part of the blank data field of each digital signal transmitted after subjected to the data detecting step through the cross connected paths of the first and the second switch matrix devices towards the last-mentioned switch elements when the error is present; and (D) flag detecting the switch request flag in each digital signal transmitted through the switching device paths to make the control device select, upon detection of the switch request flag on one of the switching device paths that is connected to one of the acting paths, for use as a fresh path of the acting paths one of the corresponding paths that corresponds to the above-mentioned one of the acting paths.

Preferably, the cross-connecting method further comprises the step of additionally detecting whether or not an erroneous datum is present in the monitor datum transmitted thereto, the additional detecting step making the control device select, upon detection of the erroneous datum on one of the switching device paths that is connected to one of the acting paths, for use as an additionally fresh path of the acting paths one of the corresponding paths that corresponds to the last-mentioned one of the acting paths.

In accordance with a different aspect of this invention, there is provided a cross connecting network which is controlled by a control device to establish a first plurality of network paths for digital signals, each digital signal including a blank data field at a period predetermined therefor, and which comprises; (A) first and second switch matrix devices having device input and output sides, each switch matrix device including a second plurality of matrix device paths in which a plurality of switch elements, equal in number to the second plurality, are interposed in each of first through P-th stages successively arranged from the device input side to the device output side, the switch elements of the stages being controlled by the control device to cross switch the matrix device paths into cross connected paths, the second plurality being not less than the first plurality, P representing a predetermined integer which is not less than three and is not greater than the first plurality, the cross connected paths of the first and the second switch matrix devices serving as duplexed parts of the network paths (B) branching means for branching a plurality of branching means paths, equal in number to the first plurality, into primary and secondary branched paths connected as additionally duplexed parts of the network paths on the device input side to the matrix device paths of the first and the second switch matrix devices; (C) a transmit switching device including a plurality of switching device paths, not less in number than the first plurality, connected as additional parts of the network paths on the device output side to a plurality of acting paths, equal in number to the first plurality, selected by the control device from the cross connected paths of the first and the second switch matrix devices with others of the cross connected paths of the first and the second switch matrix devices left as standby paths comprising corresponding paths in one-to-one correspondence to the acting paths; (D) monitor data superposing means connected to the branching means paths for superposing a monitor datum on a first part of the blank data field of each digital signal; (E) monitor data detecting means connected to the matrix device paths of the first and the second switch matrix devices nearer to the device input side than the switch elements of each of the stages, except for the first stage, for detecting whether or not an error is present in the monitor datum transmitted towards the last-mentioned switch elements; (F) switch request flag superposing means connected to the matrix device paths of the first and the second switch matrix devices between the monitor data detecting means and the last-mentioned switch elements for superposing a switch request flag on a second part of the blank data field of each digital signal when the monitor data detecting means detects presence of the error; and (G) switch request flag detecting means connected to the swiching device paths and to the control device for detecting the switch request flag to make the control device select, upon detection of the switch request flag on one of the switching device paths that is connected to one of the acting paths, for use as a fresh path of the acting paths one of the corresponding paths that corresponds to the above-mentioned one of the acting paths.

Preferably, the cross connecting network further comprises additional data detecting means connected to the switching device paths and to the control device for detecting whether or not an erronuous datum is present in the monitor datum transmitted thereto, the additional detecting means making the control device select, upon detection of the erroneous datum on one of the switching device paths that is connected to one of the acting paths, for use as an additionally fresh path of the acting paths one of the corresponding paths that corresponds to the last-mentioned one of the acting paths.

BRIEF DESCRIPTION OF THE DRAWING

FIG. 3 is a block diagram of a switch matrix device for use in the cross connecting network illustrated in FIG. 2;

FIG. 4 is a block diagram of an example of a switch part for use in the switch matrix device shown in FIG. 3 and related circuitry;

DESCRIPTION OF THE PREFERRED EMBODIMENT

Figure 1:
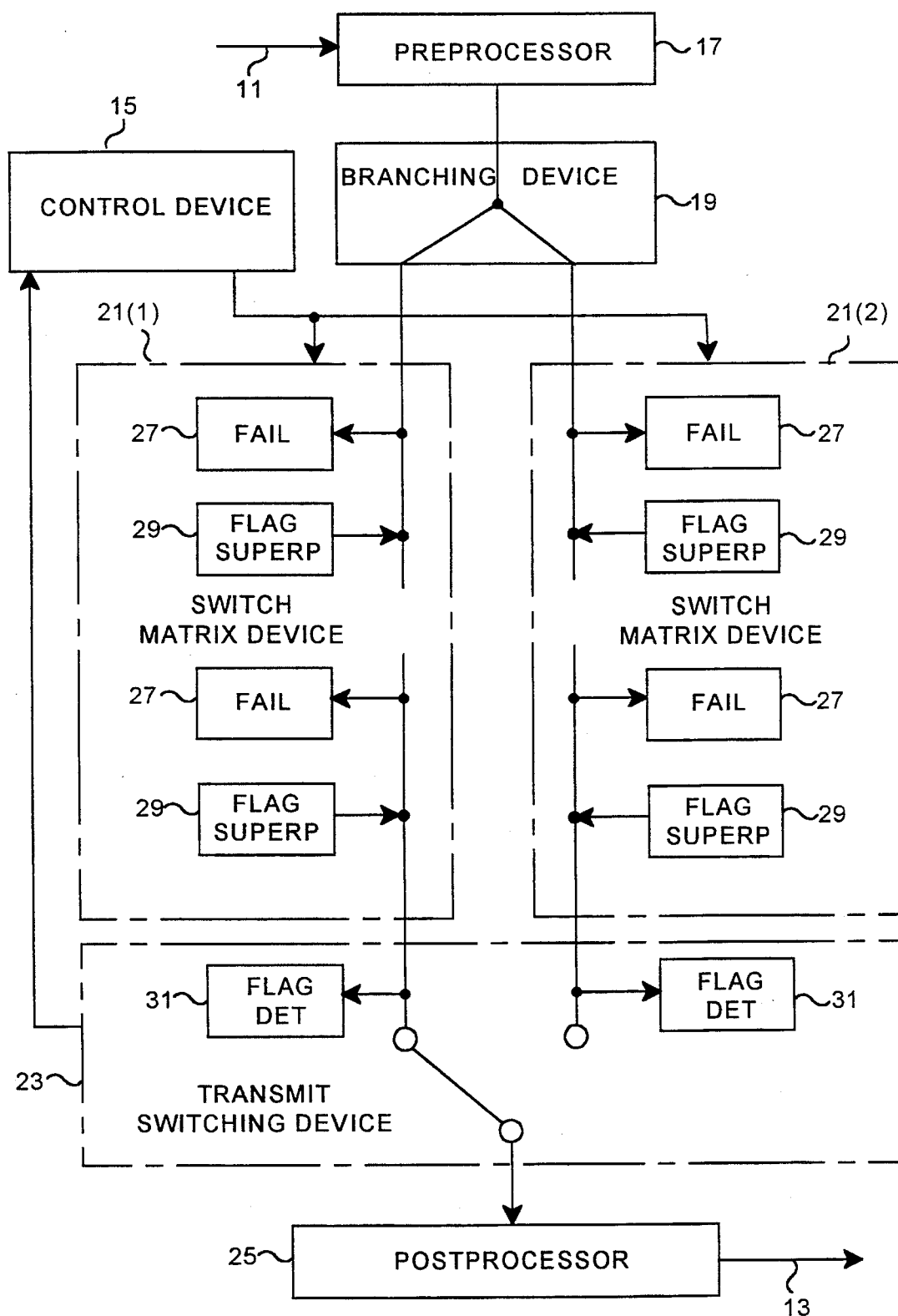
FIG. 1 is a block diagram of a prior-art cross connecting network.

Referring to FIG. 1, a prior-art cross connecting network will first be described in order to facilitate an understanding of the present invention. The cross connecting network is what is called an improved cross connecting network in the foregoing.

The cross connecting network is used between a network input line 11 and a network output line 13. It should be noted that each of such lines comprise first through N-th paths, where N represents a first plurality which is more than hundred in practice and may be as many as two thousands at preseent. The network input line 11 therefore comprises first through N-th network input paths which are not individually depicted merely for simplicity of illustration. Similarly, the network output line 13 comprises first through N-th network output paths. Each of the input and the output paths is for transmitting an electric or optical signal.

As a consequence, first through N-th network input signals are supplied in parallel through the network input line 11. First through N-th network output signals are delivered parallel through the network output line 13. The cross connecting network is controlled by a control device 15 to establish first through N-th network paths for such first through N-th network signals in the manner which will become clear as the description proceeds.

Connected to the network input line 11, a preprocessor 17 preprocesses the first through the N-th network input signals by signal conversion, such as level conversion and/or optoelectric conversion, into the first through the N-th network signals. In practice, the network signals are first through N-th digital signals and will collectively be referred to as a preprocessed signal when produced from the preprocessor 17.

Besides an information data field, each digital signal comprises a blank data field in the manner illustrated in FIG. 2 of the prior patent application mentioned hereinabove. Such blank data fields repeatedly appear in each digital signal at a period which may be predetermined in connection with the digital signal under consideration and is consequently specific to the digital signal in question. The period may, for example, be 8 kHz. Such a period may be common to the digital signals. In each digital signal, the blank data field may be given a duration of 216 bits per 20.000 bits.

Supplied with the preprocessed signal, a branching device 19 branches each digital signal into first and second branched signals. Consequently, the branching device 19 comprises first through N-th branching device paths depicted collectively by a single line near its top end. The branching device 19 branches the branching device paths into first through N-th primary and secondary branched paths. The primary branched paths are depicted again by a single line, which is directed leftwardly bottomwards. The secondary branched paths are shown by another single line drawn rightwardly bottomwards.

Connected to the branching device 19, first and second switch matrix devices 21(1) and 21(2) are-controlled by the control device 15. The first and the second switch matrix devices 21(1) and 21(2) will be either collectively or singly designated by a single reference numeral 21. The switch matrix device 21 each has a device input side and a device output side nearer to and remoter from the branching device 19 and includes a second plurality of matrix device paths, where the second plurality is not less than the first plurality. On the device input and output sides of each switch matrix device 21, only two of the matrix device paths are partly illustrated, each as a representative, by two separate single lines.

It will be presumed merely for brevity of the description that the second plurality is equal to the first plurality. In other words, the matrix device paths of each switch matrix device 21 are first through N-th matrix device paths. Supplied with the digital signals on the device input side of each switch matrix device 21 from the primary or the secondary branched paths, the first through the N-th mwitch device paths deliver the first through the N-th digital signals, respectively, to the device output side.

In the matrix device paths of each switch matrix device 21, an appreciable number of switch elements are interposed in the manner which will later be illustrated. More particularly, first through N-th, or more in general M-th, switch elements are interposed in each of first through P-th stages or columns which are successively numbered from the device input side to the device output side, where M represents the second plurality, P representing a predetermined integer which is not less than three and need not be greater than N.

Whole switch elements of the stages of each switch matrix device 21 are fixedly connected one to another by a great number of interconnecting paths into a matrix fashion and are individually controlled by the control device 15 in the manner known in the art to select the first through the N-th or M-th matrix device paths for transmission of the first through the N-th digital signals from time to time. It should therefore be noted that the matrix device paths of each switch matrix device 21 are those of the interconnecting paths which actually deliver the first through the N-th digital signals.

Controlled in this manner by the control device 15, each switch matrix device 21 serves as a space matrix switch in cross switching the first through the N-th digital signals and consequently the first through the M-th matrix device paths into first through M-th cross connected paths. It is possible to understand that each switch matrix device 21 has first through N-th device input and output terminals. The device input terminals of each switch matrix device 21 are connected to the primary or the secondary branched paths, respectively.

Each of the first through the M-th switch elements of the first stage are controlled by the control device 15 to connect its input switch lines, not greater in number than the second plurality, selectively to the first through the N-th device input terminals. The matrix device paths of each switch matrix device 21 are connected on the device input side in this manner to the primary or the secondary branched paths. The cross connected paths of the first and the second switch matrix devices 21 thus serve as duplexed parts of the network paths with or without additional redundancy. The primary and the secondary branched paths serve as additionally duplexed parts of the network paths.

Supplied from the first and the second switch matrix devices 21 with the first through the N-th digital signals in this manner with redundancy, a transmit or redundancy switching device 23 includes a plurality of switching device paths, not less in number than the first plurality. The switching device paths serve as additional parts of the network paths. It will once more be presumed that the switching device paths are first through N-th switching device paths. Only the first and the N-th switching device paths are depicted.

Controlled by the transmit switching device 23 in the manner which will later be described, the control device 15 makes the switch elements of the P-th stage in each switch matrix device 21 select a plurality of selected paths from the cross connected paths of the first and the second switch matrix devices 21. On the device otput sides of the first and the second switch matrix devices 21, the selected paths are connected to the first through the N-th switching device paths as first through N-th acting paths. Only the first and the N-th acting paths are indicated by the two lines partly drawn in the first and the second switch matrix devices 21 near their device output sides. Others of the cross connected paths of the first and the second switch matrix devices 21 are left as standby paths unconnected to the switching device paths.

In the first and the second switch matrix devices 21, the matrix device paths may be similarly cross switched into the cross connected paths from time to time. In such an event, the cross connected paths of the first switch matrix device 21(1) are in one-to-one correspondence to the cross connected paths of the second switch matrix device 21(2). The cross connected paths of the first and the second switch matrix devices 21 correspond to each other. It is possible in a like manner to understand when the second plurality is greater than the first plurality that the standby paths include first through N-th corresponding paths in one-to-one correspondence to the acting paths. At any rate, the transmit switching device 23 produces the digital signals as first through N-th switching device output signals. It is now appreciated that the first through the N-th network input signals are cross switched from time to time into the first through the N-th switching device output signals.

From the transmit switching device 23, the digital signals are delivered to a postprocessor 25 through first through N-th intermediary paths which are depicted by a single intermediate line as before. Postprocessing the digital signals by signal conversion, which may or may not be inverse relative to those used in the preprocessor 17, the postprocessor 25 delivers the first through the N-th network output signals to the network output line 13. In the example being illustrated, connections between the first through the N-th switching device paths and the single intermediary line are depicted as though through an additional switch. This manner of connection will become clear as the description proceeds.

In each of the first and the second switch matrix devices 21, a plurality of switch failure detector elements are connected to the first through the M-th matrix device paths nearer to the device output side than the switch elements of each of the first through the P-th stages. Four in total of the switch failure detector elements are exemplified at 27 and labelled FAIL. Grouped in this manner into first through P-th stage combinations, whole switch failure detector elements, such as 27, are for detecting whether or not the digital signals are transmitted through the switch elements of the combinations with abnormal states.

More specifically, each switch failure detector element 27 is immediately preceded by a preceding element of the switch elements. The switch failure detector element under consideration detects whether or not an abnormal state is present in the digital signal transmitted through the preceding element, namely, whether or not the digital signal in question is either wholly or partly lost or some spurious data are superposed on the digital signal under consideration. Very presumably, presence of the abnormal state indicates a failure in the preceding element, namely, that the preceding element is a defective element. When the abnormal state is detected on one of the cross connected paths, this one of the cross connected paths is a defective path.

Again in each of the first and the second switch matrix devices 21, a switch request flag superposing element is connected to one of the matrix device paths that is connected to each switch failure detector element 27. In the prior patent application, the switch request flag superposing element is described in greater detail as a combination of a switch demand data generator unit connected to each switch failure detector element 27 and a processing circuit connected to the switch demand data generator unit and to the matrix device path in question nearer to the device output side than one of the whole switch elements that is in the combination together with the switch failure detector element under consideration. Four of such switch request flag superposing elements in total are exemplified at 29 and labelled FLAG SUPERP. Each switch request flag superposing element 29 is connected to the switch failure detector element 27 therefor by a connection which will later be depicted.

It will be assumed that one of the switch failure detector elements 27 has detected, as a particular failure detector element, the defective element and consequently the defective path. If connected to the particular failure detector element, the switch request flag superposing element 29 superposes a switch request flag on a predetermined part of the blank data field of the digital signal transmitted through the defective path. The switch request flag indicates in this manner the defective element and the defective path.

In the transmit switching device 23, first through N-th switch request flag detector elements are connected to the first through the N-th switching device paths and to the control device 15. The switch request flag detector elements are either collectively or singly denoted by a reference numeral 31 and labelled FLAG DET. Each switch request flag detector element 31 detects the switch request flag in the digital signal transmitted thereto through one of the switching device paths that is connected at this time instant to the defective path as a particular device path. Detecting in this manner the defective element, the switch request flag detector element 31 informs the control device 15 of presence of the defective path. The control device 15 disconnects the particular device path.

If the defective path is one of the acting paths, the control device 15 selects as a fresh path for use afresh as one of the acting paths one of the corresponding paths that corresponds to the defective path. The control device 15 connects the particular device path to the fresh path. At an initial state when the cross connected paths of the first and the second switch matrix devices 21 are selectively connected to the switching device paths, the control device 15 can select arbitrary ones of such cross connected paths as the acting paths.

In the manner described in the foregoing and more in detail in the prior patent application, it is possible with the improved cross connecting network to substitute for the defective path, path by path rather than switch matrix device by switch matrix device, a faultless one of the corresponding paths as the fresh path in the acting paths. While diligently continuing reduction of such a cross connecting network into practice, the present inventor has confirmed it highly desirable to locate the defective element among the switch elements of the first and the second switch matrix devices 21.

Figure 2:
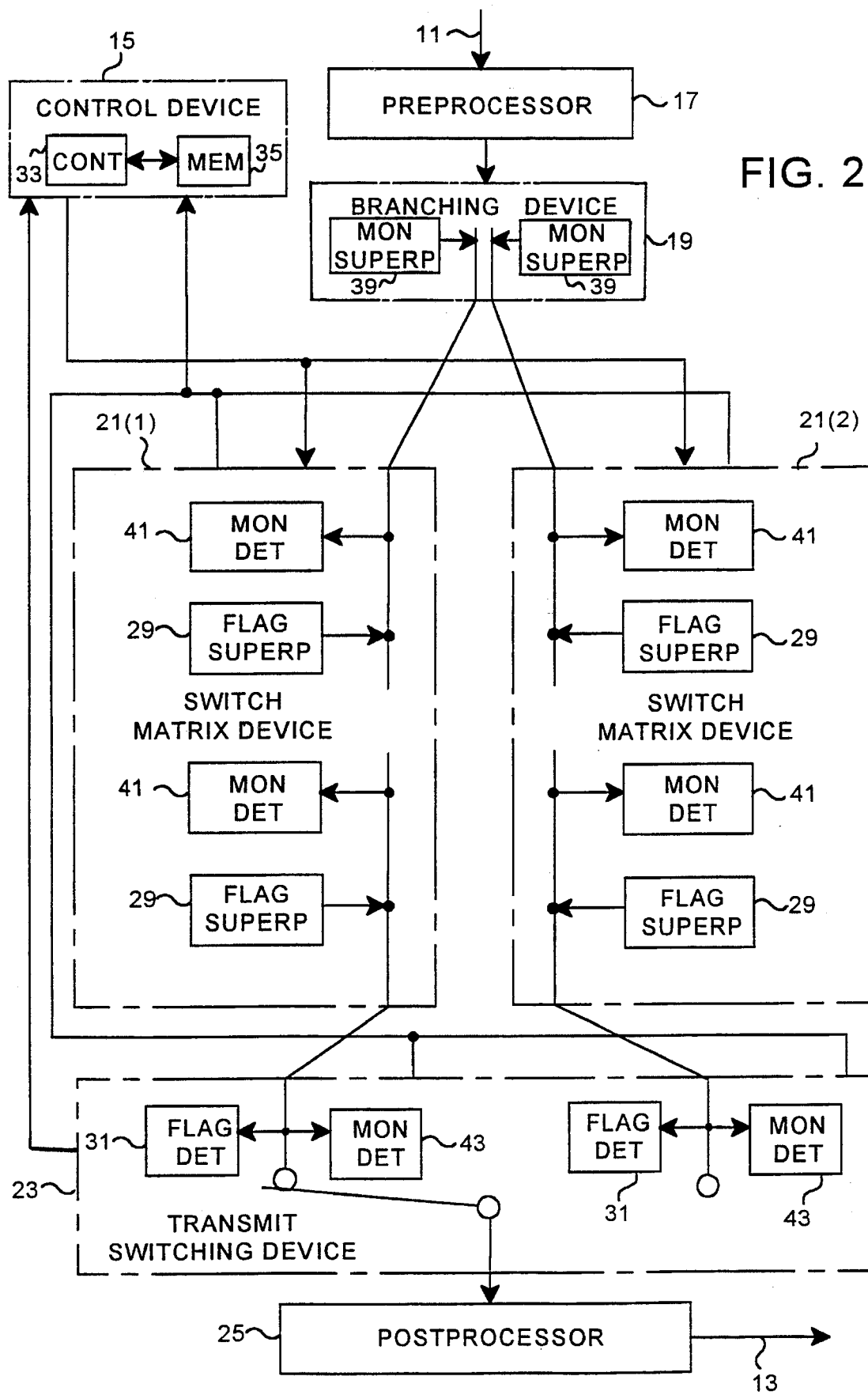
FIG. 2 is a block diagram of a cross connecting network according to an embodiment of the instant invention.

Referring now to FIG. 2, the description will proceed to a cross connecting network according to a preferred embodiment of this invention. Similar parts are designated by like reference numerals and are similarly operable with likewise named electric and optical signals. When supplied with first through N-th time division multiplexed electric ond/or optical signals, the preprocessor 17 may preprocess such first through N-th network input signals by time slot conversion into the first through the N-th digital signals for use collectively as the preprocessed signal.

Like in the improved cross connecting network described in the prior patent application, the control device 15 comprises a control unit (CONT) 33 operable as the control device described in the foregoing and a memory unit (MEM) 35 which is connected to the control unit 33. Connected additionally directly to the first and the second switch matrix devices 21 and to the transmit or redundancy switching device 23, the memory unit 35 is operable additionally as an indicator unit which will be designated by the reference numeral 35.

A combination of the preprocessor 17 and the branching device is herein referred to as a branching means or arrangement. The branching device paths are consequently called first through N-th branching means paths together with a plurality of signal paths used in the preprocessor 17 and between the preprocessor 17 and the branching device 19 in transmitting the first through the N-th digital signals collectively as the preprocessed signal. The branching means (17, 19) is for branching the branching means paths into the primary and the secondary branched paths. One alone of the primary branched paths is now represented by a vertical line depicted leftwardly. One of the secondary branched paths alone is represented another line drawn rightwardly.

Turning to FIG. 3, each switch matrix device 21 comprises the switch elements described in the foregoing. In the illustrated example, the switch elements are arranged only in first through third stages or columns from the device input side to the device output side and are labelled SW ELEM. It should be noted that each column is depicted herein horizontally. Each row of the matrix is depicted vertically.

In each stage, the switch elements are equal in number to the second plurality. It should be noted in the manner which will shortly be described that each switch element comprises a switch element proper and related circuitry. The switch element proper will be referred to either afresh as a switch element or as a switch part. In any event, the switch elements are designated along the first through the third stages by reference symbols 37(1, 1), 37(2, 1), . . . , 37(M, 1), 37(1, 2), 37(2, 2), . . . , 37(M, 2), 37(1, 3), 37(2, 3), . . . , and 37(M, 3). As before, the switch elements of the stages are either collectively or individually denoted by a reference numeral 37.

Turning back to FIG. 2 with FIG. 3 continuously referred to, the first and the third stages correspond to the foremost and the last stages mentioned in the foregoing. In the manner described in conjunction with FIG. 1, the switching device paths are not less in number than the first plurality. This number will now be represented by M'. In each switch matrix device 21, the switch elements of the stages are connected one to another by interconnecting paths. By the control unit 33, the interconnecting paths are selectively used in the manner described before as first through M-th matrix device paths in general and as first through M-th cross connected paths from time to time. This manner of operation will later be decribed in greater detail.

On the device input side of each switch matrix device 21, the switch elements 37 of the foremost stage are connected by the switch input lines selectively to the first through the N-th primary or secondary branched paths with some thereof unused at a time as redundant input lines. On the device output side, the switch elements of the last stage are connected by first through M-th device output paths selectively to first through M'-th switching device paths with some of the device output paths or of the switching device paths left unconnected depending on which of M and M' is greater.

In the illustrated example, first through N-th primary and secondary monitor data superposing elements are connected to the first through the N-th primary and secondary branched paths as labelled MON SUPERP. Again as before, such monitor data superposing elements are either collectively or individually designated by a reference numeral 39. It is possible to connect the first through the N-th monitor data superposing elements 39 of a single group to the first through the N-th branching means paths. Each monitor data superposing element 39 superposes a monitor datum of a predetermined bit pattern on a first part of the blank data field of each digital signal transmitted either through one of the primary and the secondary branched paths or through one of the branching means paths that is connected to the monitor data superposing element 39 under consideration.

It is now understood that the primary and the secondary branched paths are equivalents of the branching means paths insofar as connection thereto of the monitor data superposing elements 39 is concerned. Incidentally, it is possible to connect a single monitor data superposing element 39 either to the primary and the secondary branched paths or to their equivalents when the period is common to the digital signals.

First through M-th primary and secondary monitor data detector elements are connected to the first through the M-th matrix device paths of the first and the second switch matrix devices 21 as labelled MON DET. Once again, such monitor data detector elements are either collectively or singly designated by a reference numeral 41. In contrast to the switch failure detector elements 27 described in connection with FIG. 1, the first through the M-th monitor data detector elements 41 are connected to the matrix device paths of each switch matrix device 21 nearer to the device input side than the switch elements 37 of each of the foremost through the last stages except for the foremost stage and to the indicator unit 35.

Each monitor data detector element 41 detects the monitor datum as a detected datum in the digital signal transmitted towards one of the switch elements 37 that is immediately preceded by the monitor data detector element 41 under consideration. The monitor data detector element 41 furthermore detects whether or not an error is present in the detected datum.

The switch request flag superposing elements 29 are now first through M-th primary and secondary switch request flag superposing elements 29 connected in the first and the second switch matrix devices 21 between the monitor data detector elements 41 and the last-mentioned switch elements. In this manner, each switch request flag superposing element 29 is immediately preceded by one of the monitor data detector elements 41 that is connected to the switch request flag superposing element 29 in question as a preceding data detector element.

Each switch request flag superposing element 29 superposes the above-mentioned switch request flag now on a second part of the blank data field of the digital signal in which presence of the error is detected by the preceding data detector element. The second part may or may not be identical with the predetermined part described in connection with FIG. 1 and may or may not be different from the first part.

In the transmit switching device 23, the switch request flag detector elements 31 are now first through M'-th switch request flag detector elements 31 and are connected to the first through the M'-th switching device paths. First through M'-th additional monitor data detector elements are again labelled MON DET and are connected to the first through the M'-th switching device paths, to the indicator unit 35, and now to the control unit 33.

Once more, the additional monitor data detector elements are either collectively or individually designated by a reference numeral 43. The additional monitor data detector elements 43 are operable exactly like the monitor data detector elements 41 used in the first and the second switch matrix devices 21. The additional monitor data detector elements 43 may be referred to simply as monitor data detector elements and be denoted by the reference numeral 41.

It is now understood that the monitor data detector elements 41 of the switch matrix devices 21 and of the transmit switching device 23 are immediately preceded by the switch elements 37 of the foremost through the last stages of each switch matrix device 21 including the foremost stage. The switch request flag superposing elements 29 of each switch matrix device 21 are immediately preceded by the switch elements 37 of the foremost through the last stages except for or excluding only the last stage. Each of such switch elements 37 will be called a preceding switch element.

If presence of the error is detected by each of the monitor data detector elements 41 of the first and the second switch matrix devices 21, the monitor data detector element in question informs the indicator unit 35 of the preceding switch element as a defective element of the switch elements 37. Each additional monitor data detector element 43 indicates as the defective element additionally to the control unit 33 one of the switch elements 37 of the last stage of the switch matrix device 21 that is connected thereto. The error detected by the additional data detector element or elements 43 may be called an erroneous datum. If absence of the error or the erroneous datum is detected, each of the monitor data detector elements 41 and 43 informs the indicator unit 35 of the preceding switch element as a faultless element.

Alternatively, the additional monitor data detector elements 43 may not be connected to the control unit 33 but may instead be connected to the switch request flag detector elements 29 through first through M'-th erroneous data transmitting OR gates. It is possible to understand that the OR gates are depicted by dots representative of connection of the switching device paths to the switch request flag detector elements 29 with arrowheads understood to reversedly deliver the erronenous datum. It will be surmised in the following that this alternative manner is used in the cross connecting network.

If connected to the defective element, each of the cross connected paths in the first and the second switch matrix devices 21 is a defective path. Although called a defective path, this path can transmit the switch request flag to the switch request flag detector element 31 connected to one of the switching device paths that is connected thereto unless at least one of the switch elements 37 is connected thereto as an additionally defective element. When one of the acting paths is the defective path, the control unit 33 substitutes the fresh path for the defective path in response to an OR of the erroneous datum and detection of the switch request flag. Being informed of the defective element, the indicator unit 35 makes it readily possible to later substitute a faultless switch element for the defective element.

Use of the monitor datum enables it possible to individually locate the defective element for later replacement by a new switch element. Use of the monitor data detector element 41 nearer to the device input side than the switch elements 37 of the first and the second switch matrix devices 21 makes it furthermore possible to reliably superpose the switch request flag on each digital signal because the defective element is in upstream and does not adversely affect operation of the switch request flag superposing element 29.

It is now clearly appreciated why it is highly desirable to use each combination of the monitor data detector element 41 and the switch request flag superposing element 29 on a seemingly merely opposite side of each switch element 37 relative to a corresponding combination of the switch failure detector element 27 of FIG. 1 and the switch request flag-superposing element 29. Incidentally, the switch request flag superposing elements 29 are stepped by a clock pulse sequence indicative of successive bits in each digital signal.

Referring afresh to FIG. 4 and again to FIGS. 2 and 3, one of the switch elements 37 of the first and the second switch matrix devices 21 is depicted as an (m, p)-th switch element 37(m, p), where m represents a row integer between 1 and M, both inclusive, p representing a column integer between 1 exclusive and P inclusive. This switch element 37(m, p) is interposed in an m-th matrix device path or cross connected path in a p-th stage or column.

For convenience of the description which follows, the first through the M-th switch elements 37 of the p-th stage are referred to as (1, p)-th through (M, p)-th switch elements 37(1, p) to 37(M, p). In an immediately preceding stage, namely, in a (p-1)-th stage, the first through the M-th switch elements 37 are called (1, p-1)-th through 37(M, p-1)-th switch elements.

The switch part of the (m, p)-th switch element 37(m, p) is now labelled SW and indicated at 45 and is connected to like switch parts (not shown) of the (1, p-1)-th through the (M, p-1)-th switch elements by (m, 1, p-1)-th through (m, M, p-1)-th element input paths. The switch part 45 is connected to similar switch parts (not shown) of the first through the M-th switch elements 37 of an immediately succeeding stage by (m, 1, p)-th through (m, M, p)-th element output paths. These input and output paths are 2M in number of the interconnecting paths.

In this manner, the switch part 45 and corresponding switch parts (not shown) of the (1, p)-th through the (M, p)-th switch elements 37(1, p) to 37(M, p) are connected to the like switch parts of the (1, p-1)-th through the (M, p-1)-th switch elements by (1, 1, p-1)-th through (M, M, p-1)-th interconnecting paths. The switch parts, such as 45, of the (1, p)-th through the (M, p)-th switch elements 37(1, p) to 37(M, p) are connected to the similar switch parts of the first through the M-th switch elements 37 of the immediately succeeding stage by (1, 1, p)-th through (M, M, p)-th interconnecting paths.

When the (m, p)-th switch element 37(m, p) alone is taken into consideration, the interconnecting paths will briefly be called (1, p-1)-th through (M, p-1)-th input interconnecting paths if connected to the (1, p-1)-th through the (M, p-1)-th switch elements. The interconnecting paths will be referred to as (1, p)-th through (M, p)-th output interconnecting paths if connected to the similar switch parts of the first through the M-th switch elements 37 of the immediately succeeding stage.

Nearer than the switch part 45 to the device input side, first through M-th monitor data detector parts (MON DET) 47(1), 47(2), ..., and 47(M) are connected as parts of the monitor data detector elements 41 to the (1, p-1)-th through the (M, p-1)-th input interconnecting paths. As before, these monitor data detector parts are either collectively or singly designated by a single reference numeral 47. The monitor data detector parts 47 are additionally connected to the indicator unit 35 in the manner which will presently be described.

Attention will temporarily be directed to a (q, p-1)-th switch element among the (1, p-1)-th through the (M, p-1)-th switch elements, where q represents a modified integer between 1 and M, both inclusive, and is variable between 1 and Q or M, both inclusive. The expresson "switch part" will be omitted merely for brevity of the description.

The (q, p-1)-th switch element is connected to the (1, p)-th through the (M, p)-th switch elements by (q, 1)-th through (q, M)-th output interconnecting paths. One of the (1, p-1)-th through the (M, p-1)-th input interconnecting paths is connected to the (q, p-1)-th switch element-and is identical with a (q, m)-th output interconnecting path.

Including the first through the M-th monitor data detector parts 47 for the (m, p)-th switch element, whole monitor data detector parts of each switch matrix device 21 comprise corresponding monitor data detector parts for the (1, p)-th through the (M, p)-th switch elements. When attention is directed to the (1, p-1)-th through the (M, p-1)-th switch elements, the whole monitor data detector parts include (q, 1)-th through (q, M)-th monitor data detector parts connected to the (q, 1)-th through the (q, M)-th output interconnecting paths. As a result, one of the first through the M-th monitor data detector parts 47 is identical with a (q, m)-th monitor data detector part connected to the (q, m)-th output interconnecting path.

In operation, an n-th digital signal will be taken into consideration among the first through the N-th digital signals, where n represents a signal number between 1 and N, both inclusive. When the second plurality is greater than the first plurality, each of the row integer and the modified integer indicates the signal number with-a redundancy.

It will be surmised at a current time instant that each of the (m, p)-th switch element 37(m, p) and the (q, p-1)-th switch element deals with the n-th digital signal. Connecting the (m, p)-th switch element 37(m, p) to the (q, p-1)-th switch element, the (q, m)-th output interconnecting path, namely, one of the (1, p-1)-th through the (M, p-1)-th input interconnecting paths, serves as a part of an n-th cross connected path at the current time instant.

In this manner, the input interconnecting paths of the (1, p)-th through the (M, p)-th switch elements are selectively used from time to time as parts of first through N-th cross connected paths. That is, the output interconnecting paths of the (1, p-1)-th through the (M, p-1)-th switch elements are selectively used from time to time as parts of the first through the N-th cross connected paths.

If the (q, p-1)-th switch element is defective and deals with the n-th digital signal in cooperation with the (m, p)-th switch element 37(m, p), the (q, m)-th monitor data detector part detects the error in the monitor datum of the n-th digital signal. As a consequence, the error is indicated by one of the first through the M-th monitor data detector parts 47 that is the (q, m)-th monitor data detector part. The error would be indicated also by others of the corresponding monitor data detector parts. These others of the corresponding monitor data detector parts are, however, not responsive to the n-th digital signal including the monitor datum into which the error is introduced.

In the switch request flag superposing element 29, a switch request flag superposing part (FLAG SUPERP) 49 is connected to the first through the M-th monitor data detector parts 47 to be controlled to indicate the second part in one of the first through the N-th digital signals that is transmitted through the n-th cross connected path. This one of the digital signals is transmitted either through one of the acting paths or through one of the standby paths. Such second part or parts are represented by first through M-th local switches which are indicated by numerals 1, 2, ..., and M encircled.

A switch request flag pattern generator (FLAG GEN) 51 generates the switch request flag and is connected to the (l, p-1)-th through the (M, p-1)-th input interconnecting paths nearer than the local switches to points of connection thereto of the monitor data detector parts 47. It is possible to use the switch request flag generator 51 in common to each switch matrix device 21 or in common even with the first and the second switch matrix devices 21.

In order to reduce connections to the indicator unit 35 in number, it is possible to connect the indicator unit 35 to the (q, 1)-th through the (q, M)-th monitor data detector parts of the (l, p-1)-th through the (M, p-1)-th switch elements by first through M-th primary through M-ary connection OR gates 53(l-1) to 53(M-M), which are again either collectively or singly designated by a single reference numeral 53. It should be understood in this connection that two numerals are represented by first and last standing letters and are hyphenated. Among those two numerals, the first standing letter represents each of the first through the M-th switch elements of the (p-1)-th state. The last standing letter represents each of the (l, p)-th through the (M, p)-th switch elements, such as 37(m, P). Only the first m-ary and the M-th m-ary connection OR gates 53(1-7) and 53(M-m) are illustrated.

Various connections are described above with reference to FIG. 4. Such connections will become clear in the following.

Figure 5:
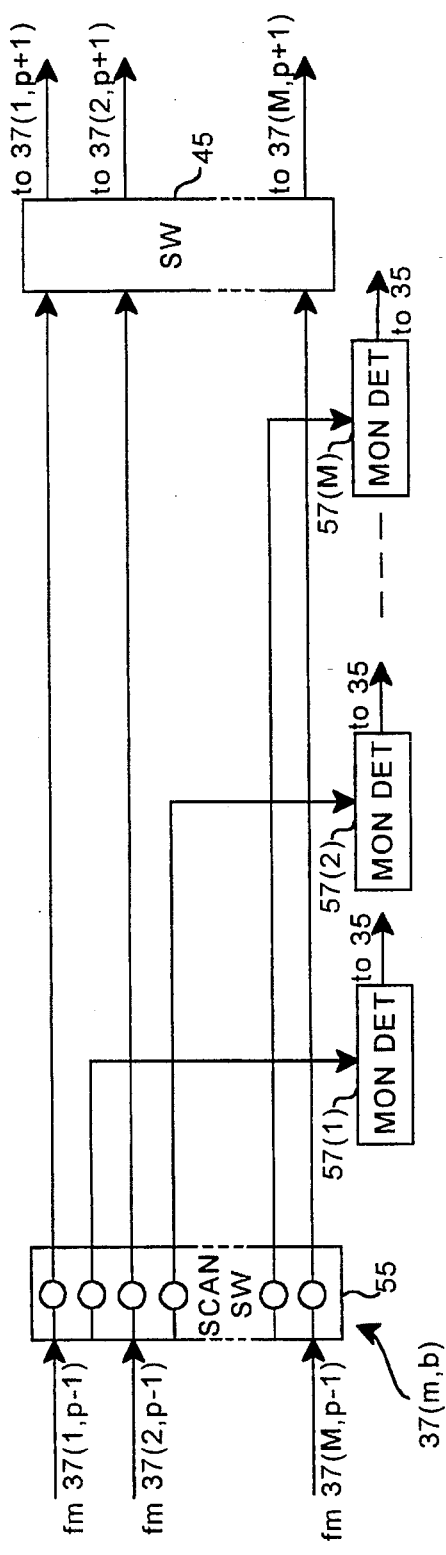
FIG. 5 is a block diagram of another example of a switch part for use in the switch matrix device illustrated in FIG. 3 and related circuitry.

Turning to FIG. 5 with FIGS. 2 through 4 continuously referred to, it will be surmised that the period of appearance of the blank data field is predetermined throughout the first through the N-th digital signals. The monitor data detector elements 41 of the (m, p)-th switch element 37(m, p) comprise a scanning switch (SCAN SW) 55 connected to the (l, p-1)-th through the (M, p-1)-th input interconnecting paths of the switch part 45 to indicate the monitor datum in the first part of the blank dada field in the first through the N-th digital signals transmitted towards the switch part 45.

Connected to the scanning switch 55, first, second, . . . , and M-th monitor data detecting parts 57(1), 57(2), . . . , and 57(M) are again either collectively or individually designated by a single reference numeral 57. These monitor data detector parts 57 are connected to the indicator unit 35 preferably through the first m-ary through the M-th m-ary connection OR gates of the type described in conjunction with FIG. 4.

Scanned by the scanning switch 55, the monitor datum is delivered to the monitor data detector parts 57 from one of the (l, p-1)-th through the (M, p-1)-th input interconnecting paths that is currently transmitting the n-th digital signal towards the switch part 45. Among the first through the M-th monitor data detector parts 57, an n-th monitor data detector part detects whether or not the error is present in the monitor datum of the n-th digital signal.

It is possible to use such a scanning switch 55 in common to the switch elements 37 of the stages in either each switch matrix device 21 or the first and the second switch matrix devices 21. Use of the scanning switch 55 is possible even when the first through the N-th digital signals have not a common period of appearance of the blank data field. In FIGS. 2 through 5, it is possible to superpose the monitor datum and/or the switch request flag on the information data field of each digital signal if either the blank data field or a part thereof is not available for superposition.

Figure 6:
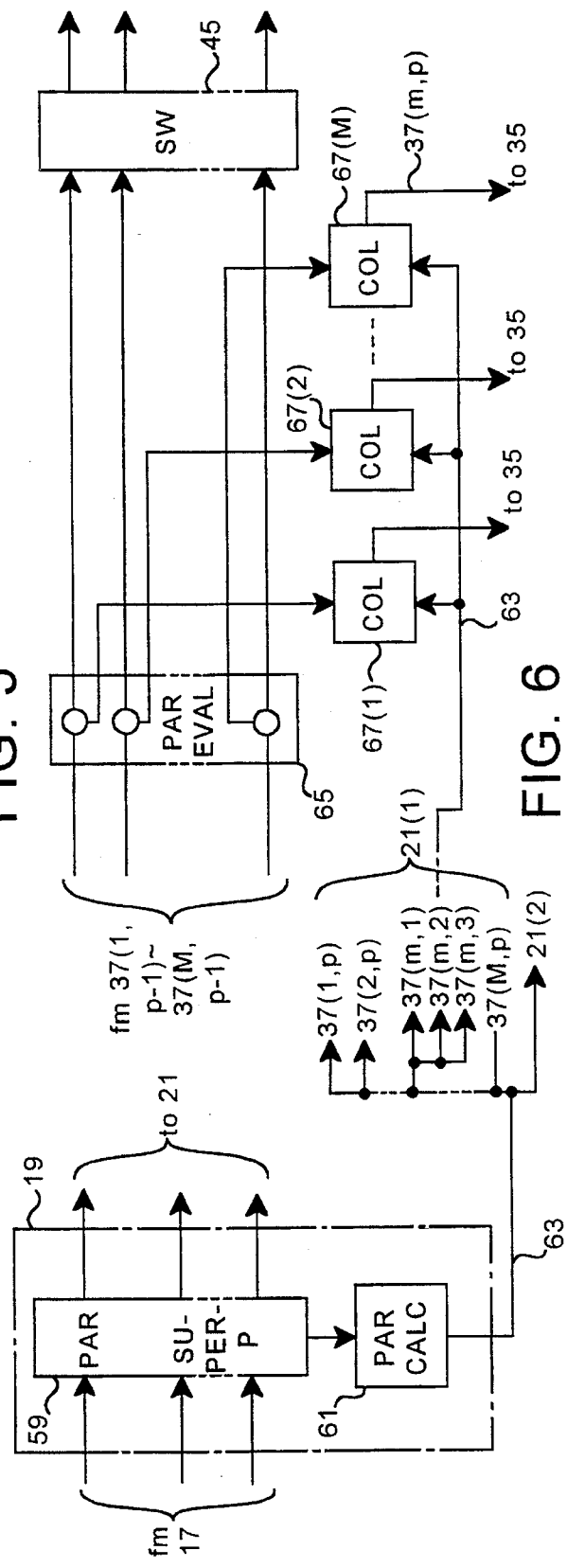
FIG. 6 is a block diagram of still another example of a switch part for use in the switch matrix device depicted in FIG. 3 and related circuitry.

Further turning to FIG. 6 with FIGS. 2 through 4 again continuously referred to, it is possible to modify the cross connecting network as follows when the first through the N-th network input signals are time division multiplexed. Even in this event, the preprocessor 17 produces first through N-th digital signals collectively as the preprocessed signal.

In the branching means or arrangement (17, 19), a parity superposing unit (BAR SUPERP) 59 is connected, as the monitor data superposing element or elements 39, to the first through the N-th branching means paths to add parity check bits to each of the first through the N-th digital signals transmitted through the branching means paths. Connected to the parity superposing unit 59, a parity calculating unit (PAR CALC) 61 calculates an original parity value.

At the branching means, an original parity value line 63(0) is connected to the parity value calculating unit 61 to convey the original parity value. The original parity value line 63(0) is extended to the first and the second switch matrix devices 21 as first and second parity value lines 63(1) and 63(2) for transmission of the original parity value to the first and the second switch matrix devices 21. Such parity value lines may be a single parity value line 63 which is used throughout the cross connecting network.

In the (m, p)-th switch element 37(m, p) which is now assumed to be in the first switch matrix device 21(1) in order to depict the parity value line 63 in detail, first through M-th parity evaluating parts are interposed in the (l, p-1)-th through the (M, p-1)-th input interconnecting paths connected to the switch part 45 in the manner collectively depicted at 65 with a label PAR EVAL merely for simplicity of illustration. It will be presumed that the first through the M-th parity evaluating parts 65 include an n-th parity evalueting part connected to one of the (l, p-1)-th through the (M, p-1)-th input interconnecting paths that transmits the n-th digital signal at a certain current time instant towards the switch part 45.

The n-th parity evaluating part evaluates the parity check bits of the n-th digital signal. Evaluating the parity check hits, the n-th parity evaluating part produces an n-th evaluated parity value.

First, second, . . . , and M-th collator parts (COL) 67(1), 67(2), . . . , and 67(M) are once more either collectively or singly designated by a reference numeral 67. The first through the M-th collator parts 67 are connected to the first through the M-th parity evaluating parts 65, to the parity value line 63, and preferably through the first m-ary through the M-th m-ary connection OR gates to the indicator unit 35 and include an n-th collator part connected to the n-th parity evaluating part.

The n-th collator part collates the n-th evaluated parity value with the original parity value received through the parity value line 63. When the n-th evaluated parity value is coincident with the original parity value, the error is absent in the n-th digital signal. Only when the n-th evaluated parity value is incoincident with the original parity value, the error is present in the n-th digital signal.

It is now understood in each switch matrix device 21 that the parity evaluating parts 65 correspond to the first through the M-th monitor data detector parts 47. A combination of the parity evaluating parts 65 serves as a parity evaluating element for detecting the evaluated parity value as a detected datum. The collator parts 67 serve collectively as an error detecting element. Connected to the parity evaluating element (65), the error detecting element (67) detects whether or not the error is present in the detected datum. A combination of the parity evaluating element and the error detecting element serves as a combination of the first through the M-th monitor data detector elements 41.

In the transmit switching device 23, each of the first through the M'-th additional monitor data detector elements 43 is composed of a combination of a parity evaluating element and a collator element. Like the first through the M-th parity evaluating parts 65 in one of the switch elements 37 of the first and the second switch matrix devices 21, such parity evaluating elements are connected to the switching device paths. Corresponding to the first though the M-th collator parts 67, such collator elements are connected to the parity evaluating elements, to the parity value line 63, through the erroneous data transmission OR gates to the switch request flag detector elements 29, and to the indicator unit 35.

FIGS. 1 through 6 will be reviewed. It should be understood that the first through the N-th digital signals are timed by a common clock pulse sequence. It is convenient to use in each switch matrix device 21 a plurality of printed circuit modules.

Each printed circuit module is the switch unit described hereinabove and comprises a relatively small number of switch elements of the type described above in first through R-th unit rows parallel to the rows in each switch matrix device 21 and in first through S-th unit columns from the device input side to the device output side. The first through the R-th unit rows include an r-th unit row, where r represents a unit row number between 1 and R, both inclusive. The first through the S-th unit columns comprise an s-th unit column, where s represents a unit column number between 1 and S, both inclusive. In the manner described in the prior patent application with reference to FIG. 12 thereof, the unit row number R may be equal to two. The unit column number S may be equal to only one.

Each switch matrix device 21 comprises the switch units consecutively in first through M/R-th block rows and in first through P/S-th block columns, assuming merely for brevity of the description that M and P are integral multiples of R and S. The first and-the P/S-th block columns are the foremost and the last stages or columns mentioned hereinabove. The first and the M/R-th block rows may be called a top and a bottom row. In this manner, the swich elements of the switch units are arranged in each switch matrix device 21 in first through M-th device rows and in first through P-th device columns or stages.

In each switch unit, the switch elements are fixedly connected one to another by cross connecting paths and are individually controlled by the control unit 33 to select parts of the cross connected paths from the cross connecting paths. In each switch matrix device 21, the switch units are removably held by a stack or frame (not shown) in the manner known in the art.

The stack is equipped with fixed wirings. When the switch units of each switch matrix device 21 are mounted on the stack, the wirings are operable to complete the connections between the switch elements in the manner described above in connection with FIG. 3. More particularly, the wirings provide connections between the switch elements of the R-th unit row in each switch unit and the switch elements of the first unit row in one of the switch units that is contiguous to the above-mentioned each switch unit along the block column. The wirings furthermore provide connections between the switch elements of the S-th unit column in each switch unit and the switch elements of the first unit column in one of the switch units that is contiguous to the last-mentioned each switch unit along the unit row.

Use of the switch units is in order to substitute a faultless unit as a whole for one of the switch units of the first and the second switch matrix devices 21 that is a defective unit because of presence of the defective element in the switch unit under consideration. The monitor data detector elements 41 are therefore used in the matrix device paths of each switch matrix device 21 nearer to the device input side than the switch elements of the first unit column in each switch unit except for the switch elements in the switch units of the foremost stage, namely, than the switch elements except for the switch elements in the switch units of the foremost stage and for the switch elements of each switch unit in the unit columns other than in the first unit column. When taken into consideration on using the monitor data detector elements 41, the switch elements will be called particular switch elements.

Immediately followed by the switch request flag superposing elements 29, the monitor data detector elements 41 of the first and the second switch matrix devices 21 are connected to the indicator unit 35 with the connection OR gates 53 preferably interposed. The additional monitor data detector elements 43 of the transmit switching device 23 are additionally connected to the indicator unit 35. The defective unit is located by the indicator unit 35. In other respects, the cross connecting network is not different from that illustrated in the foregoing with reference to FIGS. 2 through 6.

While this invention has thus far been described in specific conjunction with only one preferred embodiment thereof and several modifications, it will now be readily possible for one skilled in the art to put this invention into practice in various other manners. For example, it is possible to make the indicator unit 35 indicate either which of the switch elements 37 is the defective element or which of the switch units is the defective unit.

What is claimed is:

1. A cross connecting method of establishing under control by a control device a first plurality of network paths for digital signals, each digital signal including a blank data field at a period predetermined therefor, through a cross connecting network comprising:

first and second switch matrix devices having device input and output sides, each switch matrix device including a second plurality of matrix device paths in which a plurality of switch elements are interposed in each of foremost through last stages successively arranged from said device input side to said device output side, the switch elements of said stages being controlled by said control device to cross switch said matrix device paths into cross connected paths, said second plurality being not less than said first plurality, the cross connected paths of said first and said second switch matrix devices serving as duplexed parts of said network paths;

branching means for branching a plurality of branching means paths, equal in number to said first plurality, into primary and secondary branched paths connected as additionally duplexed parts of said network paths on said device input side to the matrix device paths of said first and said second switch matrix devices: and a transmit switching device including a plurality of switching device paths, not less in number than said first plurality, connected as additional parts of said network paths on said device output side to a plurality of acting paths, equal in number to said first plurality, selected by said control device from the cross connected paths of said first and said second switch matrix devices with others of the cross connected paths of said first and said second switch matrix devices left as standby paths comprising corresponding paths in one-to-one correspondence to said acting paths;

said cross connecting method comprising the steps of:

superposing a monitor datum on a first part of the blank data field of each digital signal transmitted through said branching means paths;

detecting said monitor datum to detect whether or not an error is present in the monitor datum transmitted through the cross connected paths of said first and said second switch matrix devices towards the switch elements of each of said stages except for said foremost stage;

superposing a switch request flag on a second part of the blank data field of each digital signal transmitted after subjected to said data detecting step through the cross connected paths of said first and said second switch matrix devices towards the last-mentioned switch elements when said error is present; and detecting said switch request flag in each digital signal transmitted through said switching device paths to make said control device select, upon detection of said switch request flag on one of said switching device paths that is connected to one of said acting paths, for use as a fresh path of said acting paths one of said corresponding paths that corresponds to said one of acting paths.

2. A cross connecting method as claimed in claim 1, further comprising the step of additionally detecting whether or not an erroneous datum is present in the monitor datum subjected thereto, said additionally detecting step making said control device select, upon detection of said erroneous datum on one of said switching device paths that is connected to one of said acting paths, for use an additionally fresh path of said acting paths one of said corresponding paths that corresponds to the last-mentioned one of acting paths.

3. A cross connecting method as claimed in claim 2, further comprising the step of indicating as a defective element, when presence of one of said error and said erroneous datum is detected, one of the switch elements of said stages of said first and said second switch matrix devices by which said one of error and erroneous datum is produced.

4. A cross connecting network controlled by a control device to establish a first plurality of network paths for digital signals, each digital signal including a blank data field at a period predetermined therefor, said cross connecting network comprising:

first and second switch matrix devices having device input and output sides, each switch matrix device including a second plurality of matrix device paths in which a plurality of switch elements, equal in number to said second plurality, are interposed in each of first through P-th stages successively arranged from said device input side to said device output side, the switch elements of said stages being controlled by said control device to cross switch said matrix device paths into cross connected paths, said second plurality being not less than said first plurality, P representing a predetermined integer which is not less than three and is not greater than said first plurality, the cross connected paths of said first and said second switch matrix devices serving as duplexed parts of said network paths;

branching means for branching a plurality of branching means paths, equal in number to said first plurality, into primary and secondary branched paths connected as additionally duplexed parts of said network paths on said device input side to the matrix device paths of said first and said second switch matrix devices:

a transmit switching device including a plurality of switching device paths, not less in number than said first plurality, connected as additional parts of said network paths on said device output side to a plurality of acting paths, equal in number to said first plurality, selected by said control device from the cross connected paths of said first and said second switch matrix devices with others of the cross connected paths of said first and said second switch matrix devices left as standby paths comprising corresponding paths in one-to-one correspondence to said acting paths;

monitor data superposing means connected to said branching means paths for superposing a monitor datum on a first part of the blank data field of each digital signal;

monitor data detecting means connected to the cross connected paths of said first and said second switch matrix devices nearer to said device input side than the switch elements of each of said stages, except for said first stage, for detecting whether or not an error is present in the monitor datum transmitted towards the last-mentioned switch elements;

switch request flag superposing means connected to the cross connected paths of said first and said second switch matrix devices between said monitor data detecting means and the last-mentioned switch elements for superposing a switch request flag on a second part of the blank data field of each digital signal when said monitor data detecting means detects presence of said error; and switch request flag detecting means connected to said switching device paths and to said control device for detecting said switch request flag to make said control device select, upon detection of said switch request flag on one of said switching device paths that is connected to one of said acting paths, for use as a fresh path of said acting paths one of said corresponding paths that corresponds to said one of acting paths.

5. A cross connecting network as claimed in claim 4, further comprising additional data detecting means connected to said switching device paths and to said control device for detecting whether or not an erroneous datum is present in the monitor datum transmitted thereto, said additional data detecting means making said control device select, upon detection of said erroneous datum on one of said switching device paths that is connected to one of said acting paths, for use as an additionally fresh path of said acting paths one of said corresponding paths that corresponds to the last-mentioned one of acting paths.

6. A cross connecting network as claimed in claim 5, further comprising defect indicating means connected to said monitor data detecting means and to said additional data detecting means for indicating as a defective element one of the switch elements of the stages of said first and said second switch matrix devices that is connected through said cross connected paths immediately to said monitor data detecting means with said switch request flag superposing means interposed and through said switching device paths to said additional data detecting means and by which one of said error and said erroneous datum is produced.

7. A cross connecting network as claimed in claim 6, wherein:

said monitor data detecting means comprises in each switch matrix device a plurality of monitor data detector elements, equal in number to said second plurality, connected to said cross connected paths nearer to said device input side than the switch elements of each of said stages except for said first stage in one-to-one correspondence to the last-mentioned switch elements to detect whether or not said error is present in the monitor datum transmitted towards the last-mentioned switch elements;

said switch request flag superposing means being connected in each switch matrix device to said cross connected paths between the last-mentioned switch elements and the monitor data detector elements corresponding to the last-mentioned switch elements;

said additional data detecting means comprising a plurality of additional data detector elements connected to said switching device paths, respectively, to detect whether or not said erroneous datum is present in the monitor datum transmitted through said switching device paths.

8. A cross connecting network as claimed in claim 7, wherein said defect indicating means is connected to the monitor data detector elements of said first and said second switch matrix devices and to said additional data detector elements to indicate said defective element when presence of said one of error and erroneous datum is detected.

9. A cross connecting network as claimed in claim 8, the switch elements of each switch matrix device comprising first through M-th switch elements in each of said stages and being (1, 1)-th through (M, p)-th switch elements including an (m, p)-th switch element, where M represents said second plurality, m representing a row integer between 1 and M, both inclusive, p representing a column integer between 1 exclusive and P inclusive to indicate a p-th stage, said additional data detector elements being first through M'-th additional data detector elements connected to said switching means paths, respectively, wherein:

the matrix device paths of each switch matrix device are included in (1, p-1)-th through (M, p-1)-th input interconnecting paths connecting said (m, p)-th switch element to the first through the M-th switch elements of an immediately preceding stage and (1, p)-th through (M, p)-th output interconnecting paths connecting said (m, p)-th switch element to the first through the M-th switch elements of an immediately succeeding stage, one of said input interconnecting paths and one of said output interconnecting paths being selectively connected to each other by said (m, p)-th switch element into one of said cross connected paths, the (1, p)-th through the (M, p)-th output interconnecting paths of the first through the M-th switch elements of said P-th stage being selectively connected to said switching device paths;

each of the monitor data detector elements of said first and said second switch matrix devices comprising, when immediately preceding said (m, p)-th switch element with said switch request flag superposing means interposed, (1, p-1)-th through (M, p-1)-th monitor data detector parts connected to the (1, p-1)-th through the (M, p-1)-th input interconnecting paths of said (m, p)-th switch element to produce an error detection signal when presence of said error is detected:

said switch request flag superposing means comprising flag pattern generating means for generating a switch request flag pattern and flag pattern supply means responsive to said error detection signal for superposing said switch request flag pattern as said switch request flag on the second part of the blank data field of each digital signal transmitted, from one of the first through the M-th switch elements of said immediately preceding stage that is said defective element, through one of the input interconnecting paths of the first through the M-th switch elements of said p-th stage that is connected to said defective element as one of said cross connected paths:

each of said first through said M'-th additional data detector elements producing a defect incication signal when presence of said erroneous datum is detected in each digital signal transmitted thereto.

10. A cross connecting network as claimed in claim 9, whein said defect indicating means comprises:

an indicator unit common to said first and said second switch matrix devices and said transmit switching device;

first through M-th OR gates connected to said indicator unit and to the (1, p-1)-th monitor data detector parts preceding in the (1, p-1)-th through the (M, p-1)-th input interconnecting paths the first thorough the M-th switch elements of said p-th stage through the (M, p-1)-th monitor data detector parts preceding in the (1, p-1)-th through the (M, p-1)-th input interconnecting paths the first through the M-th switch elements of said p-th stages, said first through said M-th OR gates transmitting to said indicator unit the error detection signals produced by ones of said (1, p-1)-th through said (M, p-1)-th monitor data detector parts that precede said (m, p)-th switch element; and connections between said indicator unit and said first through said M'-th additional data detector elements for transmitting the defect indication signals produced by said first through said M'-th additional data detector elements.

11. A cross connecting network as claimed in claim 6, the switch elements of each switch matrix device comprising first through M-th switch elements in each of said stages and being (1, 1)-th through (M, p)-th switch elements including an (m, p)-th switch element, where M represents said second plurality, m representing a row integer between 1 and M, both inclusive, p representing a column integer between 1 exclusive and P inclusive to indicate a p-th stage, wherein:

the matrix device paths of each switch matrix device are included in (1, p-1)-th through (M, p-1)-th input interconnecting paths connecting said (m, p)-th switch element to the first through the M-th switch elements of an immediately preceding stage and (1, p)-th through (M, p)-th output interconnecting paths connecting said (m, p)-th switch element to the first through the M-th switch elements of an immediately succeeding stage, one of said input interconnecting paths and one of said output interconnecting paths being selectively connected to each other by said (m, p)-th switch element into one of said cross connected paths, the (1, p)-th through the (M, p)-th output interconnecting paths of the first through the M-th switch elements of said p-th stage being selectively connected to said switching device paths:

said monitor data detecting means comprising, when immediately preceding said (m, p)-th switch element with said switch request flag superposing means interposed;

scanning switch means for cyclically scanning the (1, p-1)-th through the (M, p-1)-th input interconnecting paths of the first through the M-th switch elements of the p-th stage in each switch matrix device to detect said monitor datum as a detected datum; and an (m, p)-th monitor data detecting part corresponding to said (m, p)-th switch element to detect whether or not said error is present in said detected datum;

said additional data detecting means comprising;

a scanning switch for cyclically scanning said switching device paths at the first part of the blank data field of each digital signal transmitted through said switching device paths to detect said monitor datum as an additionally detected datum; and first through M'-th additional data detector parts connected to said scanning switch in one-to-one correspondence to said switching device paths to detect whether or not said erroneous datum is present in said additionally detected datum.

12. A cross connecting network as claimed in claim 11, wherein said defect indicating means comprises:

an indicator unit common to said first and said second switch matrix devices and said transmit switching device; and connecting means for connecting said indicator unit to said (m, p)-th monitor data detector part and to said first through said M'-th additional data detector parts.

13. A cross connecting network as claimed in claim 6, wherein:

said monitor data superposing means comprises:

a parity superposing part for adding parity check bits as said monitor datum to each digital signal transmitted through said branching means paths; and parity calculating means responsive to said parity check bits for calculating an original parity value;

said cross connecting network further comprising an additional path for transmitting said original parity value;

said monitor data detecting means comprising:

parity evaluating means for evaluating said parity check bits in each digital signal transmitted through the cross connected paths of said first and said second switch matrix devices to produce as a detected datum of said monitor datum an evaluated parity value; and first collating means for collating said evaluated parity value with the original parity value transmitted through said additional path to detect presence of said error when said evaluated parity value is incoincident with the last-mentioned original parity value:

said additional data detecting means comprising:

additional parity evaluating means for evaluating said parity check bits in each digital signal transmitted through said switching device paths to produce as an additional detected datum of said monitor datum an additionally evaluated parity value; and second collating means for collating said additionally evaluatei parity value with the original parity value transmitted through said additional path to detect presence of said erroneous datum when said additionally evaluated parity value is incoincident with the last-mentioned original parity value.

14. A cross connecting network as claimed in claim 13, the switch elements of each switch matrix device comprising first through M-th switch elements in each of said stages and being (1, 1)-th through (M, p)-th switch elements including an (m, p)-th switch element, where M represents said second plurality, m representing a row integer between 1 and M, both inclusive, p representing a column integer between 1 exclusive and P inclusive to indicate a p-th stage, said additional data detector elements being first through M'-th additional data detector elements connected to said switching device paths, respectively, wherein:

the matrix device paths of each switch matrix device are included in (1, p-1)-th through (M, p-1)-th input interconnecting paths connecting said (m, p)-th switch element to the first through the M-th switch elements of an immediately preceding stage and (m, p)-th through (M, p)-th output interconnecting paths connecting said (m, p)-th switch element to the first through the M-th switch elements of an immediately succeeding stage, one of said input interconnecting paths and one of said output interconnecting paths being selectively connected to each other by said (m, p)-th switch element into one of said cross connected paths, the (1, P)-th through the (M, p)-th output interconnecting paths of the first through the M-th switch elements of said P-th stage being selectively connected to said switching device paths;

said parity evaluating means evaluating the parity check bits in each digital signal transmitted through the (1, p-1)-th through the (M, p-1)-th input interconnecting paths of said (m, p)-th switch element in each switch matrix device to produce said evaluated parity value;

said first collating means comprising in each switch matrix device first through M-th parity collator parts in one-to-one correspondence to the first through the M-th switch elements of each of said stages for collating said evaluated parity value with the original parity value transmitted through said additional path to detect presence of said error when said evaluated parity value is incoincident with the last-mentioned original parity value;

said second collating means comprising first through M'-th secondary collator parts corresponding to said switching device paths, respectively, for collating said additionally evaluated parity value with the original parity value transmitted through said additional path to detect presence of said erroneous datum when said additionally evaluated parity value is incoincident with the last-mentioned original parity value.

15. A cross connecting network as claimed in claim 14, wherein said defect indicating means comprises:

an indicator unit common to said first and said second switch matrix devices and said transmit switching device;

first connecting means for connecting said indicator unit to the first through the M-th parity collator parts corresponding to the first through the M-th switch elements of each of said stages in each switch matrix device; and second connecting means for connecting said indicator unit to said first through said M'-th secondary collator parts.

16. A cross connecting network controlled by a control device to establish a first plurality of network paths for digital signals, each digital signal including a blank data field at a period predetermined therefor, said cross connecting network comprising:

first and second switch matrix devices having device input and output sides, each switch matrix device including a second plurality of matrix device paths in which a plurality of switch elements, equal in number to said second plurality, are interposed in each of first through P-th stages successively arranged from said device input side to said device output side with said first through said P-th stages divided into foremost through last stages to group the switch elements of each switch matrix device into a plurality of switch units, each switch unit comprising at least two elements in each switch unit column and at least one switch element in each switch element row, the switch elements of each switch unit being cross connected one to another, the switch elements of each switch matrix device being controlled by said control device to cross switch said matrix device paths into cross connected paths, said second plurality being not less than said first plurality, P representing a predetermined integer which is not less than three and is not greater than said first plurality, the cross connected paths of said first and said second switch matrix devices serving as duplexed parts of said network paths;

branching means for branching a plurality of branching means paths, equal in number to said first plurality, into primary and secondary branched paths connected as additionally duplexed parts of said network paths on said device input side to the matrix device paths of said first and said second switch matrix devices;

a transmit switching device including a plurality of switching device paths, not less in number than said first plurality, connected as additonal parts of said network paths on said device output side to a plurality of acting paths, equal in number to said first plurality, selected by said control device from the cross connected paths of said first and said second switch matrix devices with others of the cross connected paths of said first and said second switch matrix devices left as standby paths comprising corresponding paths in one-to-one correspondence to said acting paths;

monitor data superposing means connected to said branching means paths for superposing a monitor datum on a first part of the blank data field of each digital signal;

monitor data detecting means connected to the cross connected paths of said first and said second switch matrix devices nearer to said device input side than the switch elements included in the switch units of each switch matrix device as paricular switch elements, except for the switch elements in the switch units of said foremost stage and for the switch elements in the switch unit column other than a first switch unit column that is nearest in each switch unit to said device input side, for detecting whether or not an error is present in the monitor datum transmitted towards said particular switch elements;

switch request flag superposing means connected to the cross connected paths of said first and said second switch matrix devices between said monitor data detecting means and the particular switch elements of each switch matrix device for superposing a switch request flag on a second part of the blank data field of each digital signal,when said monitor data detecting means detects presence of said error; and switch request flag detecting means connected to said switching device paths and to said control device for detecting said switch request flag to make said control device select, upon detection of said switch request flag on one of said switching device paths that is connected to one of said acting paths, for use as a fresh path of said acting paths one of said corresponding paths that corresponds to said one of acting paths.

17. A cross connecting network as claimed in claim 16, further comprising additional data detecting means connected to said switching means paths and to said control device for detecting whether or not an erroneous datum is present in the monitor datum transmitted thereto, said additional data detecting means making said control device select, upon detection of said erroneous datum on one of said switching device paths that is connected to one of said acting paths, for use as an additionally fresh path of said acting paths one of said corresponding paths that corresponds to the last-mentioned one of acting paths.

18. A cross connecting network as claimed in claim 17, further comprising defect indicating means connected to said monitor data detecting means and to said additional data detecting means for indicating as a defective element one of the switch elements of said first and said second switch matrix devices that is connected through said cross connected paths immediately to said monitor data detecting means with said switch request flag superposing means interposed and through said switching device paths to said additional data datecting means and by which presence of one of said error and said erroneous datum is detected.

\* \* \* \* \*

UNITED STATES PATENT AND TRADEMARK OFFICE
CERTIFICATE OF CORRECTION

PATENT NO. : 5,459,718
DATED : October 17, 1995
INVENTOR(S) : Toshihiko KUSANO

It is certified that error appears in the above-indentified patent and that said Letters Patent is hereby corrected as shown below:

On the title page, tiem [54] and column 1, line 2, the title should read--

CROSS CONNECTION BY USING A SWITCH REQUEST FLAG IF A DIGITAL SIGNAL FAILS BEFORE SUPPLY TO CROSS CONNECTED SWITCH UNITS--.

Signed and Sealed this

Thirtieth Day of January, 1996

Attest:

BRUCE LEHMAN

Attesting Officer     Commissioner of Patents and Trademarks